United States Patent [19]
Hartmeier

[11] Patent Number: 4,636,842
[45] Date of Patent: Jan. 13, 1987

[54] COMB FILTER "HANGING DOT" ELIMINATOR

[75] Inventor: Werner N. Hartmeier, Geroldswil, Switzerland

[73] Assignee: RCA Corporation, Princeton, N.J.

[21] Appl. No.: 676,095

[22] Filed: Nov. 29, 1984

[51] Int. Cl.⁴ .............................................. H04N 9/64
[52] U.S. Cl. ....................................... 358/31; 358/36
[58] Field of Search .................... 358/31, 36, 37, 329

[56] References Cited

U.S. PATENT DOCUMENTS

| | | | |
|---|---|---|---|
| 4,050,084 | 9/1977 | Rossi | 358/31 |
| 4,072,984 | 2/1978 | Kaiser | 358/31 |
| 4,149,181 | 4/1979 | Burdick et al. | 358/31 |
| 4,167,021 | 9/1979 | Holmes | 358/36 |
| 4,178,609 | 12/1979 | Beutel | 358/31 |
| 4,240,105 | 12/1980 | Faroudja | 358/31 |
| 4,241,363 | 12/1980 | Maeyama et al. | 358/36 |
| 4,307,413 | 12/1981 | Takeuchi et al. | 358/31 |
| 4,443,817 | 4/1984 | Faroudja | 358/36 X |
| 4,513,311 | 4/1985 | Hirai et al. | 358/31 X |

FOREIGN PATENT DOCUMENTS

| | | | |
|---|---|---|---|
| 0150687 | 11/1980 | Japan | 358/31 |
| 0048789 | 5/1981 | Japan | 358/31 |
| 0031287 | 2/1982 | Japan | 358/31 |
| 0057881 | 4/1983 | Japan | 358/31 |
| 2067872 | 7/1981 | United Kingdom | 358/31 |

OTHER PUBLICATIONS

John Rossi, "Digital TV Comb Filter with Adaptive Features", Proceedings of the Conference on Video and Data, Birmingham, England (20-22 Jul. 1976), pp. 267-282.

Kaiser, A., "Comb Filter Improvement with Spurious Chroma Deletion", SMPTE Jor., vol. 86, No. 1, Jan. 1977, pp. 1-5.

*Primary Examiner*—Michael A. Masinick
*Assistant Examiner*—Michael P. Dunnam
*Attorney, Agent, or Firm*—E. M. Whitacre; P. J. Rasmussen; E. P. Herrmann

[57] ABSTRACT

An interline comb filter for separating luminance signal from composite video includes a subcarrier trap which is selectively engaged in the comb filtered luminance signal path to remove "hanging dots". Control for the subcarrier trap is provided from vertical detail signals.

1 Claim, 2 Drawing Figures

COMB FILTER "HANGING DOT" ELIMINATOR

The present invention relates to apparatus for removing artifacts from line comb filtered video signals.

BACKGROUND OF THE INVENTION

The generally high line-to-line correlation of conventional television video signals makes possible the separation of chrominance and luminance components of composite video signals with interline comb filters. The cancellation of luminance in comb filtered chrominance signals and the cancellation of chrominance in comb filtered luminance signals can only be achieved when this underlying assumption holds true. When it does not, both the comb filtered luminance and the comb filtered chrominance signals are contaminated with cross components.

A particularly objectionable artifact is present in reproduced images when line-to-line chrominance changes occur. This artifact is manifested as a dot pattern (known as hanging dots) which appears along horizontal edges of displayed images. The dots have a spatial frequency corresponding to the subcarrier temporal frequency. The dot pattern results from incomplete cancellation of the chrominance component from the comb filtered luminance component. The contaminating chrominance signal is generally a narrow band signal having a frequency equal to the color subcarrier frequency.

Arthur Kaiser in the article "Comb Filter Improvement with Spurious Chroma Detection", SMPTE Journal, Vol. 86, No. 1, 1977, pp. 1–5, describes apparatus for reducing the effects of uncancelled chrominance in the luminance component. This apparatus compares composite video signals separated by two lines to detect vertical image changes. When changes occur, the comb filtered luminance signal is selectively low-pass filtered to attenuate the band of frequencies occupied by the chrominance signal, thereby substantially eliminating the dot pattern. However, the low-pass filter also eliminates all of the high frequency luminance components.

SUMMARY OF THE INVENTION

The present invention is an interline comb filter which combines current and delayed composite video signals to produce comb filtered luminance and chrominance signal components. The comb filtered luminance signal is coupled to means which selectively rejects the subcarrier frequency in response to a control signal. The comb filtered chrominance signal is coupled to a low-pass filter to extract low frequency luminance vertical detail. A detector, connected to the low-pass filter, generates the control signal when the vertical detail signal exceeds a predetermined level.

DETAILED DESCRIPTION

The invention will be described in terms of a digital embodiment but may be practiced on either analog or digital signals. Digital video samples applied to the circuitry are assumed to represent analog composite video signal which has been sampled at a rate of four times the color subcarrier frequency. Broad arrows connecting circuit elements designate multi-conductor connections for parallel bit digital samples. Narrow arrows connecting circuit elements designate single conductor connections. Elements bearing like designation numerals in the two drawings are similar or equivalent circuits.

Figure 1:
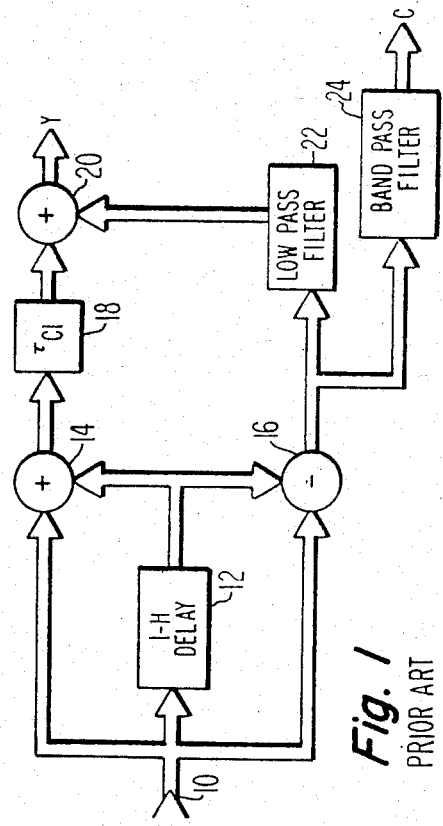
FIG. 1 is a block diagram of a prior art interline comb filter including apparatus for restoring vertical detail to the comb filtered luminance signal.

FIG. 1 is a known interline comb filter circuit. In the circuit digital composite video samples are applied to input port 10. These samples are applied to adder 14, subtracter 16 and the 1-H delay element 12. Video samples delayed one horizontal line period from delay element 12 are additively combined with non-delayed samples in adder 14 to produce comb filtered luminance signal.

Video samples from delay element 12 are subtractively combined with non-delayed samples in subtracter 16 to produce comb filtered chrominance signal. The comb filtered chrominance signal is applied to low-pass filter 22. The output signal from low-pass filter 22 is applied to adder 20 wherein it is combined with the comb filtered luminance signal. Low-pass filter 22 produces output signal when line-to-line luminance differences occur. As such, this output signal corresponds to luminance vertical detail information. Adding it back to the comb filtered luminance component tends to restore the luminance signal vertical frequency response.

The comb filtered luminance signal from adder 14 is coupled to adder 20 via a delay element 18. Element 18 introduces a delay, $\tau C1$, to the comb filtered luminance samples to compensate for the processing delays of the vertical detail signal through low-pass filter 22.

Comb filtered chrominance samples provided by subtracter 16 are applied to a band-pass filter 24 which selectively passes a signal occupying the frequency band of the chrominance signal. Band-pass filter 24 substantially removes an uncancelled luminance signal from the comb filtered chrominance signal.

As set forth earlier, line-to-line chrominance changes introduce a color subcarrier component into the comb filtered luminance signal. This subcarrier component may be removed by incorporating a subcarrier trap filter in the comb filtered luminance signal path. However, if such a trap is placed permanently in the luminance signal path the high frequency response of the luminance signal will be undesirably affected. Therefore, the trap should be selectively introduced in the luminance signal path only during those intervals when the comb filtered luminance signal is contaminated with the subcarrier.

To provide this selective trapping, some means for detecting line-to-line chrominance changes is required. The present inventor reasoned that there should be a high correlation between line-to-line luminance changes and line-to-line chrominance changes. This being the case, the luminance vertical detail information extracted from the comb filtered chrominance signal should provide an indication of when the comb filtered luminance signal is being contaminated by incompletely cancelled chrominance signal.

Figure 2:
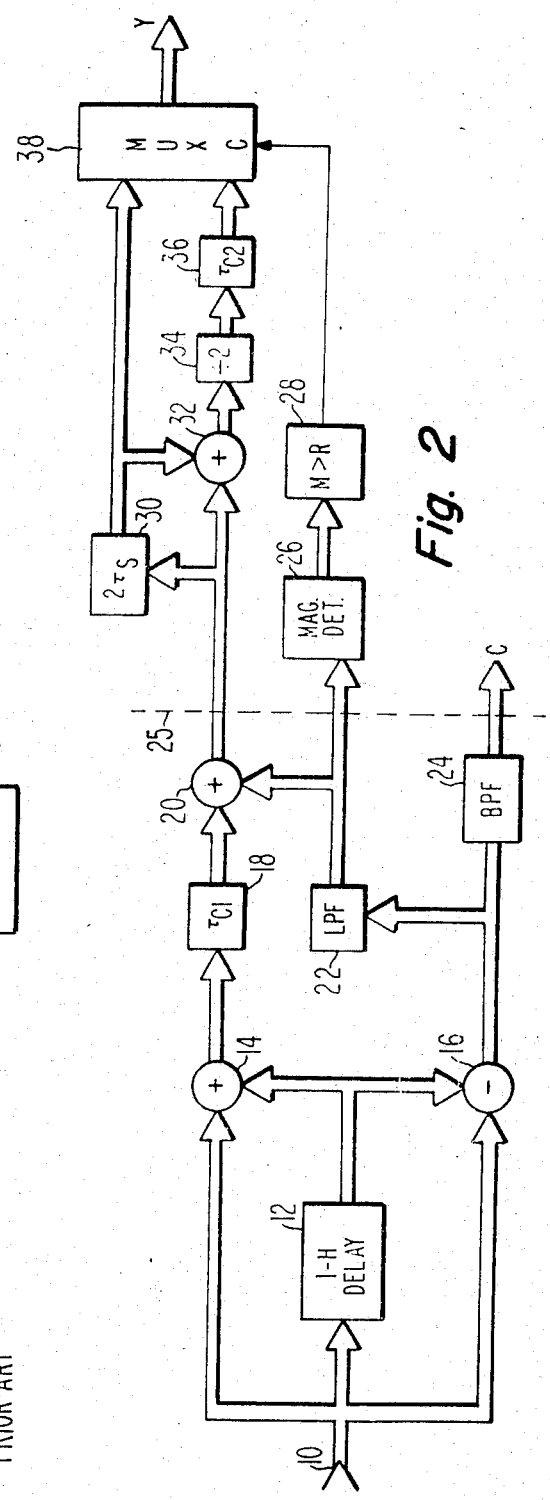
FIG. 2 is a block diagram of an interline comb filter with circuitry for removing hanging dots embodying the present invention.

FIG. 2 illustrates exemplary circuitry for utilizing vertical detail signal to selectively remove color subcarrier which contaminates comb filtered luminance signal. In FIG. 2, elements to the left of dashed line 25 correspond to the FIG. 1 comb filter. Comb filtered luminance signal with vertical detail restored is coupled from adder 20 to multiplexer 38 via two signal paths. The first signal path incorporates only delay element 30 which imposes a two-sample delay period on samples coupled therethrough. The second signal path includes the subcarrier trap or notch filter consisting of adder 32 and delay element 30, divide-by-two element 34, and delay stage 36. Responsive to a control signal applied to its control input terminal C, multiplexer 38 outputs luminance samples from delay element 30 in the absence of vertical detail signal and outputs notch filtered luminance samples from delay stage 36 when vertical detail signals are detected.

Delay element 30, having its input and output ports coupled to the two input ports of adder 32, forms a two tap output weighted finite impulse response notch filter or trap. Chrominance components of samples at the input and output ports of delay element 30 correspond to a single cycle of the color subcarrier and are 180° out of phase. The algebraic sum of these samples cancel in adder 32 thereby eliminating the subcarrier present in the comb filtered luminance signal. Alternatively, luminance components outside the band of frequencies occupied by the chrominance component tend to add constructively. To normalize the luminance component from adder 32 it is divided by two in element 34. If the digital samples are in binary format, divide-by-two element 34 may be a hard wired bit-shift arrangement which shifts the summed sample bits rightward one significant bit position.

The normalized luminance samples from divide-by-two element 34 are coupled to multiplexer 38 by delay stage 36. Delay stage 36 provides a compensating delay, $\tau C2$, to temporally align the luminance samples from divide-by-two element 34 with the luminance samples from delay element 30. Temporal alignment of the luminance samples in the two paths minimizes display discontinuities when multiplexer 38 switches between luminance signals.

The control signal which is applied to multiplexer 38 is developed by magnitude detector 26 and comparator 28. Magnitude detector 26 converts the vertical detail samples output from low-pass filter 22 to single polarity samples which are applied to comparator 28. Comparator 28 produces a logical one control signal when the magnitude, M, of the samples exceeds a predetermined reference value R and a logical zero control signal when M is less than R. The magnitude detector is incorporated to simplify the design of comparator 28, i.e. comparator 28 may be a unipolar threshold detector. In the absence of magnitude detector 26 comparator 28 will be a bipolarity or window comparator which produces a logical one control signal for vertical detail signal greater than R and less than $-R$.

What is claimed is:

1. A comb filter system for separating a luminance signal component from composite video signal including a chrominance signal modulating a subcarrier, comprising:

a source of said composite video signal;

delay means having an input coupled to said source and having an output terminal, for providing composite video signal delayed by an integral number of horizontal line intervals;

first signal combining means, having an output terminal, and having respective input terminals coupled to said source and the output terminal of said delay means, for combining composite video signal and delayed composite video signal to produce a comb filtered luminance signal;

second signal combining means having an output terminal, and having respective input terminals coupled to said source and the output terminal of said delay means, for combining composite video signal and delayed composite video signal to produce a comb filtered chrominance signal including luminance vertical detail information;

filter means having an input terminal coupled to the output terminal of said second signal combining means, and having an output terminal for substantially attenuating signals in the band of frequencies normally occupied by said chrominance signal;

third signal combining means having an output terminal and having respective input terminals coupled to the output terminals of said first combining means and said filter means respectively for providing comb filtered luminance signal with vertical detail substantially restored;

detection means having an input terminal coupled to said output terminal of said filter means, for generating control signals when the magnitude of signal from said filter means exceeds a predetermined magnitude;

further delay means having an output terminal and having an input terminal coupled to the output terminal of said third signal combining means, for delaying signal by one-half period of the chrominance subcarrier;

fourth signal combining means having an output terminal and having respective input terminals coupled to the output terminals of said third combining means and said further delay means for additively combining signals applied to its input terminals;

multiplexing means having a control input terminal coupled to said detection means, having a first signal input terminal coupled to said further delay means, having a second signal input terminal coupled to the output terminal of said fourth signal combining means, and having an output terminal, wherein said multiplexing means couples signal from its first signal input terminal to its output terminal in the absence of said control signals and couples signal from its second input terminal to its output terminal on the occurrence of said control signals.

* * * * *